United States Patent [19]

Gensicke

[11] 4,187,579
[45] Feb. 12, 1980

[54] ADJUSTABLE HINGE FOR MOTOR-VEHICLE SEAT

[75] Inventor: Walter Gensicke, Rockenhausen, Fed. Rep. of Germany

[73] Assignee: Keiper Automobiltechnik GmbH & Co KG, Remscheid-Hasten, Fed. Rep. of Germany

[21] Appl. No.: 862,821

[22] Filed: Dec. 21, 1977

[30] Foreign Application Priority Data

Dec. 22, 1976 [DE] Fed. Rep. of Germany ....... 7640079

[51] Int. Cl.² .................................. E05D 11/10
[52] U.S. Cl. .................................. 16/139; 16/140; 297/362
[58] Field of Search ............... 16/139, 140, 144, 143; 297/362; 74/804

[56] References Cited

U.S. PATENT DOCUMENTS

| | | | |
|---|---|---|---|
| 3,401,979 | 9/1968 | Putsch | 297/362 |
| 3,667,804 | 6/1972 | Yasui et al. | 297/362 |
| 3,673,891 | 7/1972 | Pickles | 297/362 X |
| 3,823,440 | 7/1974 | Klingelhofer | 16/139 |
| 4,020,717 | 5/1977 | Johnson | 297/362 |
| 4,025,109 | 5/1977 | Klingelhofer et al. | 16/139 X |

FOREIGN PATENT DOCUMENTS

| | | |
|---|---|---|
| 2130873 | 1/1973 Fed. Rep. of Germany | 297/362 |
| 2615789 | 10/1976 Fed. Rep. of Germany | 297/362 |
| 2303502 | 10/1976 France | 297/362 |

*Primary Examiner*—James Kee Chi
*Attorney, Agent, or Firm*—Michael J. Striker

[57] ABSTRACT

An adjustable hinge for interconnecting the back part and seat part of a motor-vehicle seat has a fixed hinge element secured to the seat part and a movable hinge element secured to the back part. The movable hinge element is provided with a pinion having outer teeth centered on a movable axis and is further provided with a disk riveted with the pinion to the movable element and having an outer edge surface also centered on the movable axis. The fixed hinge element has a recess with a circular inner edge surface aligned radially with the outer edge surface of the disk and centered on a fixed axis spaced from the movable axis. Furthermore the fixed hinge element is formed with an array of inner teeth aligned with the outer teeth. The tooth depth is smaller than the spacing between the axes and there are fewer outer teeth than inner teeth. An eccentric ring carried on a handle has a circular outer periphery riding on the outer edge surface of the disk so that rotation of the handle orbits the movable axis about the fixed axis and adjusts the inclination between the hinge elements.

10 Claims, 6 Drawing Figures

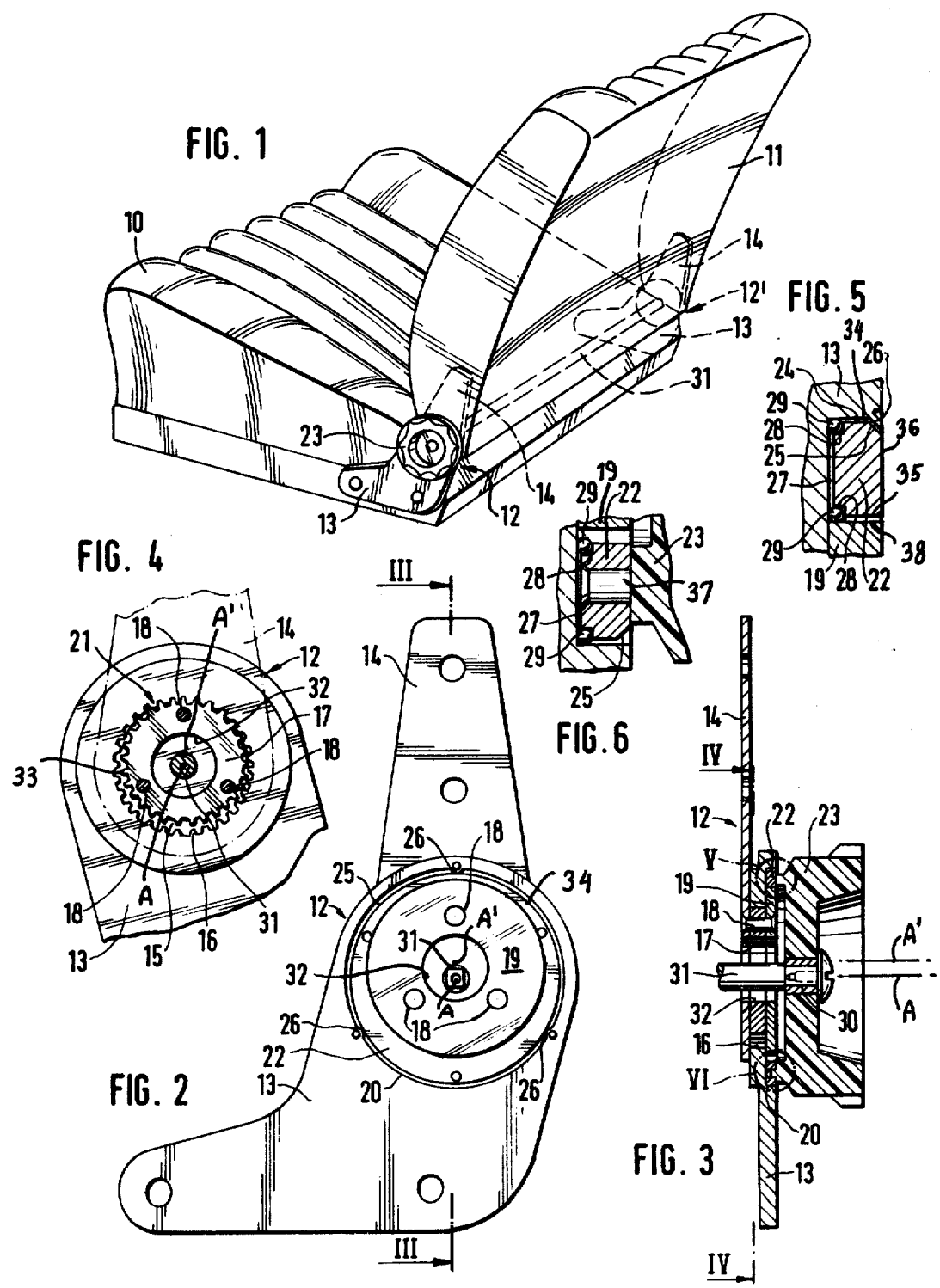

ADJUSTABLE HINGE FOR MOTOR-VEHICLE SEAT

BACKGROUND OF THE INVENTION

The present invention relates to an adjustable hinge for a motor-vehicle seat. More particularly this invention concerns a hinge which can tilt the back part of a motor-vehicle seat in stepless fashion relative to the seat part thereof.

An adjustable hinge for a motor-vehicle seat is known from U.S. Pat. No. 3,401,979 and German patent publication 1,580,543 which has a pair of hinge elements relatively steplessly displaceable so that the angle of the back part of the seat can be varied relative to the seat part. To this end one of the hinge elements is connected to one of these parts and the other element is connected to the other part. The one element has an inwardly directed array of inner teeth centered on a respective axis and the other part has an outwardly directed array of outer teeth centered on another axis spaced from the first-mentioned axis. The array of outer teeth has less teeth than the array of inner teeth, typically one less tooth, and is of smaller diameter so that the outer teeth can fit within the inner teeth with only a few of the teeth engaged.

In such an arrangement means is provided for orbiting one of the axes about the other axis and thereby rolling the inner teeth around inside the outer teeth, and correspondingly displacing the entire back part relative to the axis of the array of the seat part. As the inner teeth roll off inside the outer teeth the angle formed between the back part and seat part is changed.

Such an arrangement has the advantage that it allows stepless adjustment of the back part relative to the seat part. Furthermore the distribution of forces within the adjustable hinge is such that the setting does not change due to vibration or forces exerted on the back part.

Such adjustable hinges are typically, however, relatively bulky and expensive to manufacture. In particular the standard practice is to bolt the array of inner teeth in the form of a pinion on the fixed element connected to the seat part of the seat and to bolt the outer array in the form of a ring gear on the movable element connected to the back part. A collar is mounted on the pinion and centered on the respective axis thereof and a sleeve arrangement is mounted on the ring gear and in turn centered on its axis. An eccentric ring is fitted between the collar and the sleeve and is normally constituted of synthetic-resin material. Thus the element is axially relatively long and is formed of a large number of parts so that its assembly is relatively difficult and expensive.

SUMMARY OF THE INVENTION

It is therefore an object of the present invention to provide an improved adjustable hinge.

Yet another object is to provide such a hinge which is relatively simple in construction and inexpensive to manufacture.

These objects are attained according to the instant invention in a hinge of the above-described general type wherein the first hinge element which is connected to one of the parts of the motor-vehicle seat carries an array of outwardly directed outer teeth which are centered on a first axis. A disk is fixed to this first element axially adjacent the array of outer teeth and has a circular outer edge surface which is also centered on the first axis. The second hinge element which is connected to the other part of the seat has a recess formed with a circular inner edge surface aligned radially with the edge surface of the disk and centered on a second axis spaced from and substantially parallel to the first axis. Furthermore this second hinge element carries an array of inwardly directed inner teeth which are radially aligned with the outer teeth of the first element. These teeth all of tooth depths equal at least to the spacing between the axes. An eccentric ring, made of metal, has a circular outer periphery juxtaposed with the inner edge surface and centered on the second axis and an inner periphery juxtaposed with the outer edge surface and centered on the first axis. Means including a handle is connected to this ring for rotating it about the axes and thereby orbiting the axes about each other with simultaneous rolling of the array of outer teeth in the array of inner teeth. Such rolling changes the inclination between the parts of the motor-vehicle seat.

Thus aside from the two hinge elements it is only necessary to mount on the one element a pinion having the outer teeth, a coaxial disk, and the eccentric ring with its handle to form the entire mechanism. The assembly is therefore relatively simple and also of relatively short axial length. The construction and assembly costs are correspondingly reduced, without in any way impairing the efficiency of operation of the unit.

According to a further feature of this invention the eccentric ring is secured to the hinge element formed with the recess simply by deforming a portion of this hinge element over the ring, to which end the corresponding surface of the eccentric ring may be bevelled or chamfered at its edge.

According to further features of this invention the inner and outer peripheries of the ring are formed with axially and radially open grooves in which are received balls constituting bearings via which the eccentric ring rides on the first element.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing.

BRIEF DESCRIPTION OF THE DRAWING

FIG. 1 is a perspective view of a motor-vehicle seat equipped with a hinge according to the instant invention;

FIG. 2 is an axial end view of one of the hinges shown in FIG. 1;

FIG. 3 is a section taken along line III—III of FIG. 2;

FIG. 4 is a section taken along line IV—IV of FIG. 3; and

FIGS. 5 and 6 are large-scale views of the details indicated at dot-dash circles V and VI, respectively, of FIG. 3, with a handle partially shown in FIG. 6 but omitted in FIG. 5.

DESCRIPTION OF A PREFERRED EMBODIMENT

As shown in FIG. 1 a motor-vehicle seat has a fixed seat part 10 and a displaceable back part 11 interconnected by a pair of almost identical or symmetrically identical hinges 12 and 12'. Hereinbelow the description will relate only to the hinge 12, it being assumed that the hinge 12' is identical unless specifically stated to the contrary.

The hinge 12 is formed by a lower or fixed hinge element or plate 13 and an upper or movable hinge element or plate 14. The lower part 13 is formed with a recess 15 centered on an axis A and formed with thirty inwardly directed inner teeth 16.

Received within this recess 15 is a pinion 17 with an inner periphery 32 and having twenty-nine outwardly directed outer teeth 33 centered on an axis A' spaced from the axis A by a distance at least equal to the depth of the identical teeth 16 and 33. A disk 19 has an outer edge 38 centered on this axis A' and is secured by means of three axially extending rivets 18 with the pinion 17 to the element 14.

The inner teeth 16 of the lower part 13 and the outer teeth 33 of the pinion 17 therefore mesh at a region 21 (see FIG. 4) so that if the axis A' is orbited about the axis A the inclination between the two hinge elements 13 and 14 will inherently change.

This effect is achieved by means of a cylindrical recess 20 having an inner edge surface 34 centered on the axis A and in this recess 20 an eccentric ring 22 having an outer periphery 24 centered on the second axis A and an inner periphery 35 centered on the first axis A'. At the corner between one axial face 36 and the surface 24 of the ring 22 there is formed a chamfer or bevel 25 extending at a 45° angle to the respective surfaces and cooperating with bent-over formations 26 deformed out of the material of the element 13 and serving to hold the ring 22 in axial place on the element 13. Furthermore at its inner and outer peripheries 24 and 35 at its other axial face 27 the ring 22 is formed with a pair of axially and radially open grooves 28 in which are received balls 29 constituting roller bearings for easy rotation of the ring 22 in the fixed element 13 about the axis A thereof.

A synthetic-resin knob or handle 23 is secured by means of rivets 37 (FIG. 6) to the ring 22 and at its center has a polygonal-section hole 30 in which is received one end of a rod 31 passing through concentric holes in the elements 22, 17 and 14. The other end of this rod 31 is secured to another such knob 23 mounted on the other hinge 12', or the disk 19 of the other hinge 12' can simply have a central square-section hole in which is received the opposite axial end of the rod 31 for coupling-together of the two hinges 12 and 12'.

Thus with the system according to the present invention as the handle 23 is rotated the ring 22 will rotate about the axis A defined by the element 13. Since the inner and outer peripheries 35 and 24 of the ring 22 are eccentric to each other this will cause the axis A' to orbit about the axis A. Correspondingly the elements 14, 17 and 19 will move relative to the element 13 and will therefore adjust the angle between these elements 13 and 14.

It would be possible to replace the eccentric ring 22 with an eccentric sleeve if space permits. In addition the eccentric ring 22 could be formed integrally with the handle 23. Rather than three angularly equispaced deformed regions 26 to secure the ring 22 on the element 13, it would be possible to deform the entire outer edge of this element 13 over into the chamfer 25. Furthermore simple removable screws and washers or other arrangements could be provided for axially holding together the plate 13 and ring 22. In addition either or both of the bearings 29 could be eliminated and/or replaced by roller bearings of the cylindrical-roller type.

It will be understood that each of the elements described above, or two or more together, may also find a useful application in other types of structures differing from the types described above.

While the invention has been illustrated and described as embodied in an adjustable hinge, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An adjustable hinge for interconnecting the back part and the seat part of a motor-vehicle seat, said hinge comprising:
   a first hinge element connected to one of said parts;
   an array of outwardly directed outer teeth centered on a first axis and fixed on said first element;
   a disk fixed to said first element adjacent said array of outer teeth and having a circular outer edge surface centered on said first axis;
   a second hinge element connected to the other of said parts and having a recess with a circular inner edge surface aligned radially with said edge surface of said disk and centered on a second axis spaced from and substantially parallel to said first axis, said second hinge element having in radial alignment with said array of outer teeth an array of inwardly directed inner teeth centered on said second axis, said outer and inner teeth having tooth depths equal at least to the spacing between said axes;
   an eccentric ring having a circular outer periphery juxtaposed with said inner edge surface and centered on said second axis and an inner periphery juxtaposed with said outer edge surface and centered on said first axis; and
   means including a handle connected to said ring for rotating same about said second axis and thereby orbiting said first axis about said second axis while simultaneously rolling said array of outer teeth in said array of inner teeth and thereby changing the inclination between said parts.

2. The hinge defined in claim 1 wherein said array of outer teeth has at least one more tooth than said array of inner teeth, all of said teeth being substantially identically dimensioned.

3. The hinge defined in claim 2 wherein said outer edge of said disk extends radially beyond said outer teeth and also radially at least partially beyond said inner teeth, said inner teeth being at least partially axially sandwiched between said disk and said first element.

4. The hinge defined in claim 1 wherein one of said edge surfaces at least partially radially overlaps the other edge surface.

5. The hinge defined in claim 4 wherein said one edge surface is said edge surface of said recess, and said other edge surface is beveled to receive the radially overlapping portion of said other edge surface.

6. The hinge defined in claim 1, further comprising roller bearings supporting said ring on said disk and on said second element.

7. The hinge defined in claim 6 wherein said peripheries are formed with radially and axially open grooves centered on the respective axes, said bearings including balls in said grooves.

8. The hinge defined in claim 1 wherein said one part carrying said first hinge element is said back part.

9. The hinge defined in claim 1 wherein said first hinge element includes a pinion having said outer teeth.

10. The hinge defined in claim 1 wherein said second hinge element is integrally formed with said inner teeth.